(No Model.)
M. F. WILLIAMS.
CLAY MIXER AND FEEDER.
No. 514,690. Patented Feb. 13, 1894.
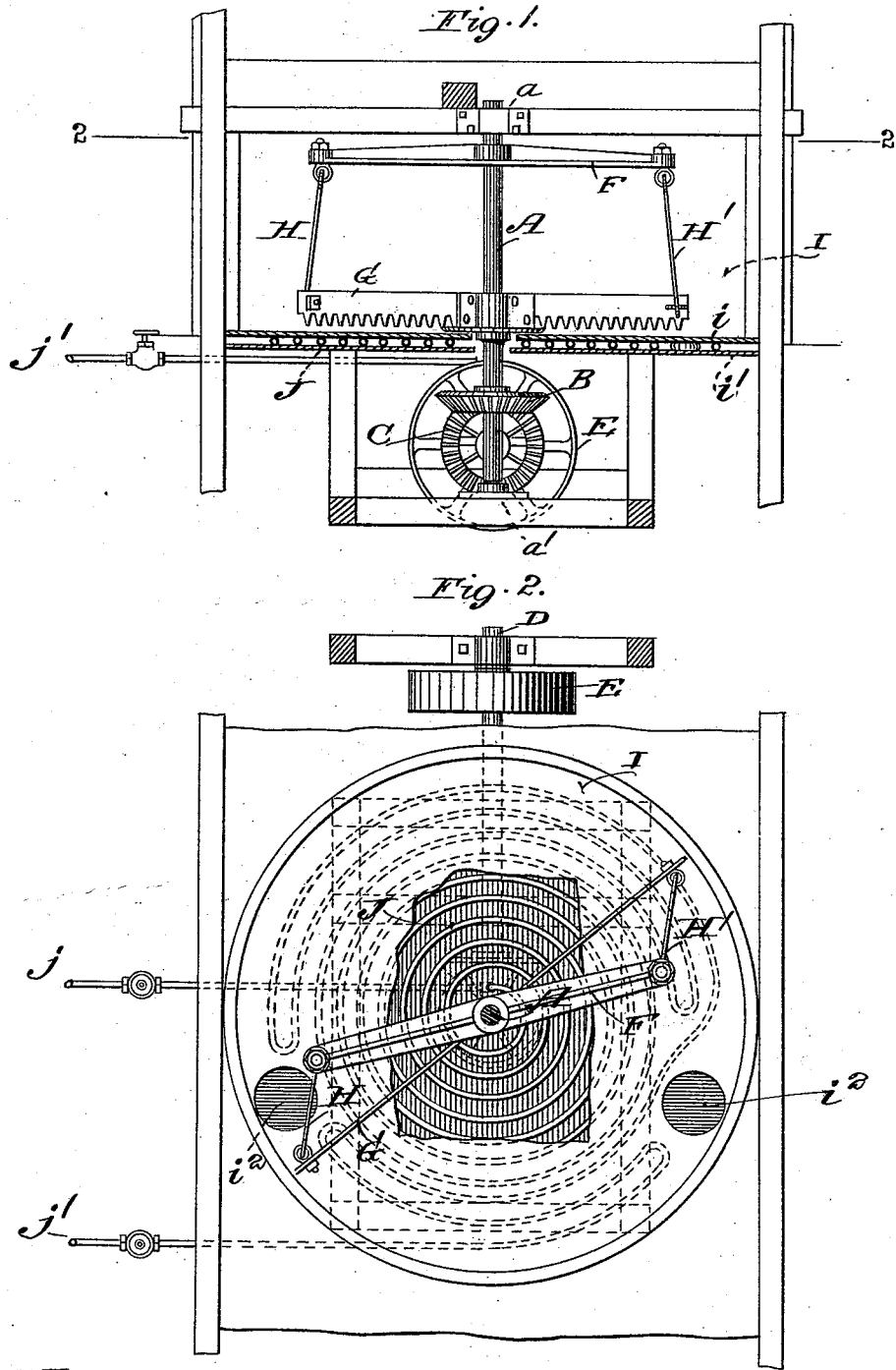
Witnesses:
Edward W. Purrell
A. Bonville
Inventor
Milton F. Williams
By C. D. Moody
his atty

UNITED STATES PATENT OFFICE.

MILTON F. WILLIAMS, OF ST. LOUIS, MISSOURI.

CLAY MIXER AND FEEDER.

SPECIFICATION forming part of Letters Patent No. 514,690, dated February 13, 1894.

Application filed March 8, 1893. Serial No. 465,064. (No model.)

*To all whom it may concern:*

Be it known that I, MILTON F. WILLIAMS, of St. Louis, Missouri, have made a new and useful Improvement in Clay Mixers and Feeders, of which the following is a full, clear, and exact description.

The improved construction under consideration is adapted for thoroughly mixing fine coarse clays, and after mixing them delivering them to any desired quarter, and the improvement has reference mainly to the mode of heating the receptacle in which the clays are mixed.

The annexed drawings exhibits the improved construction in its most desirable form.

Figure 1 is a vertical section thereof, and Fig. 2 a horizontal section on the line 2—2 of Fig. 1.

The same letters of reference denote the same parts.

Only that portion of the clay-handling mechanism essential to an understanding of the present improvement is shown.

When more fully carried out the present device forms a portion of a system for treating clay for dry presses. It is arranged beneath the mechanism for screening the clay, and above the press or presses which use the clay.

A represents an upright shaft journaled in a bearing $a$, and stepped at $a'$, and provided with a bevel gear B. This last named part engages with a beveled gear, C, on a horizontal shaft, D, which is also provided with means such as the pulley E for imparting rotary motion to the last named shaft and thereby causing the upright shaft, A, to be rotated.

F represents an arm arranged horizontally and secured to the shaft A to be carried around therewith in its rotation.

G represents a rake which is hung centrally upon the shaft A, but is loose thereon. At or toward its ends respectively ties H, H', are connected which lead to the arm F above. The ties are jointed to said rake and arm. The rotation of the shaft A is thus enabled to accomplish the rotation of the rake, and the parts assume the position shown in Fig. 2; that is, the arm F moves in advance of the rake and the ties H, H', assume an inclined position, substantially as shown, and a drawing-motion is thus employed in operating the rake.

A suitable chamber, I, serves to contain the described mechanism and also the clay to be treated.

The clay is fed from above to drop in front of the rake which is at a suitable elevation above the floor, $i$, of the chamber. The rotation of the rake causes the clay to be carried around and around and to be gradually worked from the central portion of the floor toward the peripheral portion thereof where it is discharged through one or more outlets, $i^2$, and thence it passes to the presses, not shown, or elsewhere as desired. Now, in treating clay under the conditions described, difficulty is constantly experienced from the sticking of the clay, and various means have heretofore been employed for obviating the difficulty.

The present improvement has for its object to lessen if not remove the trouble which has existed, and the improvement consists in the application of heat to the under side of the chamber-floor, $i$, by means of a pipe adapted for conveying steam, or other heated current which is wound around, in a substantially-spiral direction, beneath the floor $i$, and above the sub-floor $i'$, substantially as shown.

J represents the pipe in question. Its inlet end, $j$, and which is supposed to lead from a suitable heat-supply—a steam-boiler for instance, and which is not shown—extends to beneath the central portion of the floor, $i$, and thence winds around spirally, or in some analogous manner, and after passing around and around repeatedly, and in a constantly enlarging coil, substantially as shown, and so as to extend substantially to beneath the peripheral portion of the floor I its outlet-portion, $j'$, returns to the source of the heat-supply preferably. But this is not essential. By this means the chamber-bottom is not only heated, but heated advantageously in that the greater heat is applied to the central portion of the floor. For, as stated the clay to be treated is delivered originally onto the more central portion of the floor and is thence worked toward the peripheral portion of the floor, and, in the manner described the heat is applied rather to the central portion of the floor and less to the peripheral portion thereof, and accordingly is applied where it is most needed.

I claim—

1. In combination with the clay mixer or feeder, substantially as described, a coiled heating pipe whose inlet end is located centrally beneath the bottom and its exit end beneath the periphery of the floor, whereby the heat will be greatest underneath the central portion of the mixer and feeder floor, and more mild under the peripheral part thereof.

2. The combination in a clay mixer and feeder of the chamber, I, the outlets for the clay in the peripheral portion of the chamber-floor, the revolving rake, and the steam-pipe arranged beneath the chamber-floor and having its inlet end underneath the central portion of the floor and its outlet portion underneath the peripheral portion of the floor, substantially as described.

Witness my hand this 24th day of February, 1893.

MILTON F. WILLIAMS.

Witnesses:
C. D. MOODY,
A. BONVILLE.